(12) United States Patent
Pan et al.

(10) Patent No.: US 11,809,063 B1
(45) Date of Patent: Nov. 7, 2023

(54) AUDIO AND VIDEO STREAMING DEVICE AND METHOD FOR CONTROLLING OUTPUT OF AUDIO AND VIDEO STREAMING SIGNAL

(71) Applicant: PRIMAX ELECTRONICS LTD., Taipei (TW)

(72) Inventors: Yung-Tai Pan, Taipei (TW); Yu-Cheng Ma, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/804,183

(22) Filed: May 26, 2022

(30) Foreign Application Priority Data

Apr. 15, 2022 (TW) .................................. 111114388

(51) Int. Cl.
| | |
|---|---|
| *G03B 11/04* | (2021.01) |
| *G03B 17/12* | (2021.01) |
| *H04N 23/65* | (2023.01) |
| *G03B 17/56* | (2021.01) |
| *G03B 17/02* | (2021.01) |

(52) U.S. Cl.
CPC .............. *G03B 11/04* (2013.01); *G03B 17/02* (2013.01); *G03B 17/56* (2013.01); *H04N 23/651* (2023.01); *G03B 2205/0053* (2013.01); *G03B 2217/007* (2013.01)

(58) Field of Classification Search
CPC ........ G03B 11/04; G03B 17/12; G03B 17/56; G03B 2205/0053; G03B 2217/007; H04N 23/651
See application file for complete search history.

(56) References Cited

U.S. PATENT DOCUMENTS

| | | | | |
|---|---|---|---|---|
| 11,119,388 | B2 * | 9/2021 | Weng .................... | G03B 11/041 |
| 11,221,542 | B2 * | 1/2022 | Yang .................... | G03B 11/043 |
| 11,294,260 | B2 * | 4/2022 | Park ...................... | G06F 1/1686 |
| 11,619,862 | B2 * | 4/2023 | Wu ....................... | G03B 11/043 |
| | | | | 396/452 |
| 2020/0201143 | A1 * | 6/2020 | Imai ..................... | G03B 11/043 |
| 2022/0019126 | A1 * | 1/2022 | Peana ..................... | H04N 7/18 |
| 2022/0171258 | A1 * | 6/2022 | Chang .................... | H04N 23/55 |
| 2022/0400200 | A1 * | 12/2022 | Lagnado ............... | H04N 23/611 |

\* cited by examiner

*Primary Examiner* — Clayton E. LaBalle
*Assistant Examiner* — Diana Hancock
(74) *Attorney, Agent, or Firm* — WPAT, P.C

(57) ABSTRACT

An audio and video streaming device includes a device main body and a lens cover. The device main body includes a power source, a lens element, an audio and video output unit and a sensing and controlling module. When the power source is in an on state and a relationship between the lens cover and the lens element is in an opened state, the sensing and controlling module issues an audio and video streaming signal to the audio and video output unit. When the power source is in the on state and the relationship between the lens cover and the lens element is in a closed state, the sensing and controlling module stops issuing the audio and video streaming signal, and the power source is maintained in the on state.

8 Claims, 5 Drawing Sheets

US 11,809,063 B1

AUDIO AND VIDEO STREAMING DEVICE AND METHOD FOR CONTROLLING OUTPUT OF AUDIO AND VIDEO STREAMING SIGNAL

FIELD OF THE INVENTION

The present invention relates to an audio and video streaming device and a method for controlling an audio and video streaming device to output an audio and video streaming signal, and more particularly to an audio and video streaming device and a method for controlling an audio and video streaming device to output an audio and video streaming signal when a video recording process is interrupted.

BACKGROUND OF THE INVENTION

Many people have experience of using digital electronic devices (e.g., digital cameras, smart phones, handheld tablets, computers or professional digital video recorders) to perform a video recording task. In some situations, the user needs to pause the video recording process. However, in most of the conventional digital electronic devices, the function of allowing the user to interrupt the video recording process is limited or insufficient.

For example, an audio and video streaming device is used to perform a live video streaming operation in the internet. If the user intends to temporarily interrupt the live video streaming operation, the usual method is to directly cover the lens element with the lens cover. After the lens element is covered, the audio and video streaming device is unable to output the image streaming signal. For example, a complete black image is shown. However, the audio streaming signal is still outputted. Consequently, there may be a problem that the privacy information of the audio effect is leaked without the user's awareness.

In some conventional audio and video streaming devices, a function of automatically detecting whether the lens element is covered by the lens cover is provided. When the audio and video streaming device detects that the lens element is covered by the lens cover, the audio and video streaming device is powered off immediately. For using the audio and video streaming device, it is necessary to power on the audio and video streaming device again, or even it is necessary to set the video recording parameters again. In other words, the conventional audio and video streaming device is not user-friendly.

In order to overcome the drawbacks of the conventional technologies, it is important to provide an audio and video streaming device capable of temporarily interrupting the video recording process while avoiding the problem of leaking the audio privacy information or avoiding the frequent restarting trouble.

SUMMARY OF THE INVENTION

The present invention provides an audio and video streaming device and a method for controlling an audio and video streaming device to output an audio and video streaming signal. When the user intends to temporarily interrupt the video recording process, the audio and video streaming device stops outputting both of the image streaming signal and the audio streaming signal.

The present invention provides an audio and video streaming device and a method for controlling an audio and video streaming device to output an audio and video streaming signal. When the user intends to temporarily interrupt the video recording process, the power source of the audio and video streaming device is maintained in the on state.

In accordance with an aspect of the present invention, an audio and video streaming device is provided. The audio and video streaming device includes a device main body and a lens cover. The lens cover is selectively combined with the device main body. The device main body at least includes a power source, a lens element, an audio and video output unit and a sensing and controlling module. The lens cover is selectively combined with the lens element. The sensing and controlling module is electrically connected with the audio and video output unit. When the power source is in an on state and a relationship between the lens cover and the lens element is in an opened state, the sensing and controlling module continuously issues an audio and video streaming signal to the audio and video output unit. When the power source is in the on state and the relationship between the lens cover and the lens element is in a closed state, the sensing and controlling module stops issuing the audio and video streaming signal to the audio and video output unit, and the power source is maintained in the on state.

In an embodiment, the audio and video streaming signal at least contains an image streaming signal and an audio streaming signal.

In an embodiment, when the relationship between the lens cover and the lens element is in the closed state, at least a portion of an effective photographing region of the lens element is sheltered by the lens cover. When the relationship between the lens cover and the lens element is in the opened state, the effective photographing region of the lens element is not sheltered by the lens cover.

In an embodiment, after the lens cover is moved from a first position to a second position, the at least a portion of the effective photographing region of the lens element is sheltered by the lens cover. Consequently, the relationship between the lens cover and the lens element is in the closed state. After the lens cover is moved from the second position to the first position, the effective photographing region of the lens element is not sheltered by the lens cover. Consequently, the relationship between the lens cover and the lens element is in the opened state.

In an embodiment, the lens cover is mechanically driven to undergo a moving action between the first position and the second position in an upward/downward sliding manner, a leftward/rightward sliding manner, an upwardly/downwardly rotating manner or a leftward/rightward rotating manner.

In an embodiment, the lens cover is movable between the first position and the second position in a manual operation manner.

In an embodiment, the sensing and controlling module at least includes a sensing element and a control chip. The sensing element senses whether the relationship between the lens cover and the lens element is in one of the closed state and the opened state, and generates a sensing result. The control chip is electrically connected with the sensing element, the power source and the audio and video output unit. According to the sensing result, the control chip determines whether the audio and video streaming signal is transmitted to the audio and video output unit while the power source is maintained in the on state.

In an embodiment, the sensing element includes at least one of an electromechanical sensor, an optical sensor and an electromagnetic sensor.

In accordance with another aspect of the present invention, a method for controlling an audio and video streaming device to output an audio and video streaming signal is provided. Firstly, a power source of the audio and video streaming device is enabled, so that the audio and video streaming device issues the audio and video streaming signal. When the power source is in an on state, the audio and video streaming device senses and judges whether a relationship between a lens cover and a lens element of the audio and video streaming device is in one of a closed state and an opened state. When the power source is in the on state and the relationship between the lens cover and the lens element is in the closed state, the audio and video streaming device stops issuing the audio and video streaming signal to the audio and video output unit, and the power source is still in the on state. When the power source is in the on state and the relationship between the lens cover and the lens element is in the closed state, the audio and video streaming device stops issuing the audio and video streaming signal and the power source is maintained in the on state. When the power source is in the on state and the relationship between the lens cover and the lens element is in the opened state, the audio and video streaming device continuously issues the audio and video streaming signal.

In an embodiment, the audio and video streaming signal at least contains an image streaming signal and an audio streaming signal.

In an embodiment, when the relationship between the lens cover and the lens element is in the closed state, at least a portion of an effective photographing region of the lens element is sheltered by the lens cover. When the relationship between the lens cover and the lens element is in the opened state, the effective photographing region of the lens element is not sheltered by the lens cover.

In an embodiment, after the lens cover is moved from a first position to a second position, the at least a portion of the effective photographing region of the lens element is sheltered by the lens cover, so that the relationship between the lens cover and the lens element is in the closed state. After the lens cover is moved from the second position to the first position, the effective photographing region of the lens element is not sheltered by the lens cover, so that the relationship between the lens cover and the lens element is in the opened state.

In an embodiment, the lens cover is mechanically driven to undergo a moving action between the first position and the second position in an upward/downward sliding manner, a leftward/rightward sliding manner, an upwardly/downwardly rotating manner or a leftward/rightward rotating manner.

In an embodiment, the lens cover is movable between the first position and the second position in a manual operation manner.

In an embodiment, the audio and video streaming device at least includes a sensing element, and the sensing element senses whether the relationship between the lens cover and the lens element is in one of the closed state and the opened state.

In an embodiment, the sensing element includes at least one of an electromechanical sensor, an optical sensor and an electromagnetic sensor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides an audio and video streaming device. In the following embodiments, the relationship between a lens cover and a lens element has two scenarios. In a first scenario, the lens element is not covered by the lens cover, and the relationship between the lens cover and the lens element is referred as an opened state. In a second scenario, the lens element is covered by the lens cover, and the relationship between the lens cover and the lens element is referred as a closed state. The operating concepts of the audio and video streaming device will be described as follows.

Figure 1A:
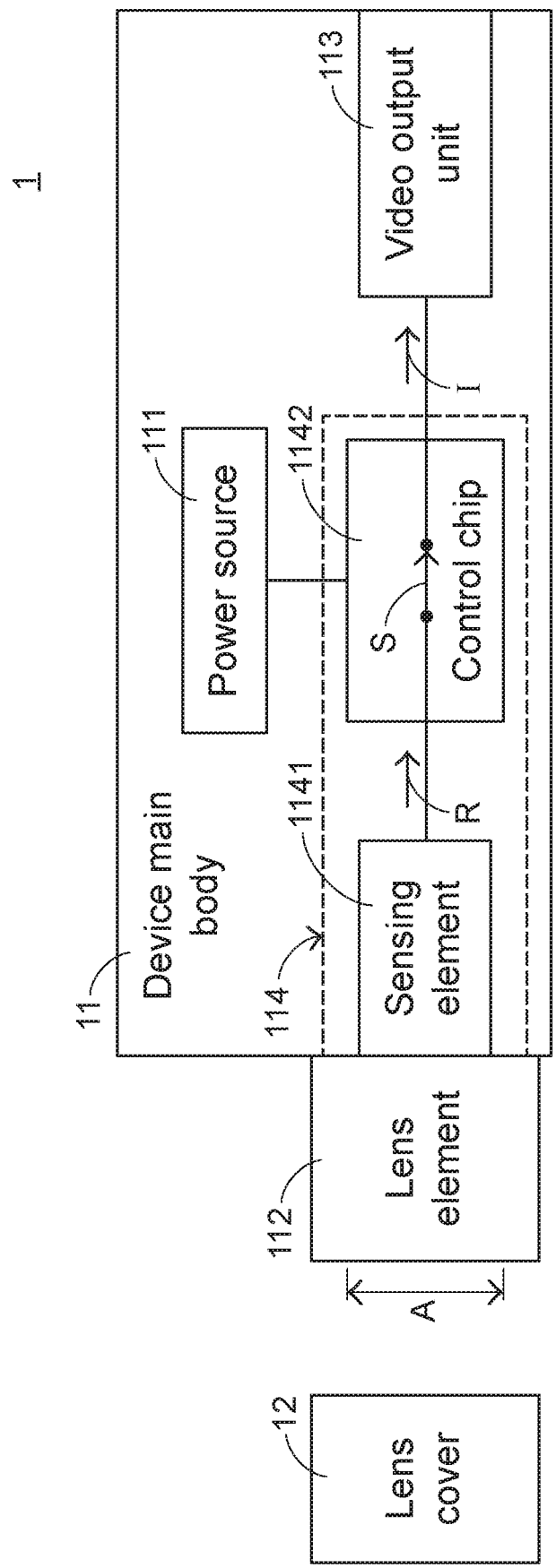
FIG. 1A is a schematic functional block diagram illustrating the architecture of an audio and video streaming device according to an embodiment of the present invention, in which the relationship between the lens cover and the lens element of the audio and video streaming device is in an opened state.
Figure 1B:
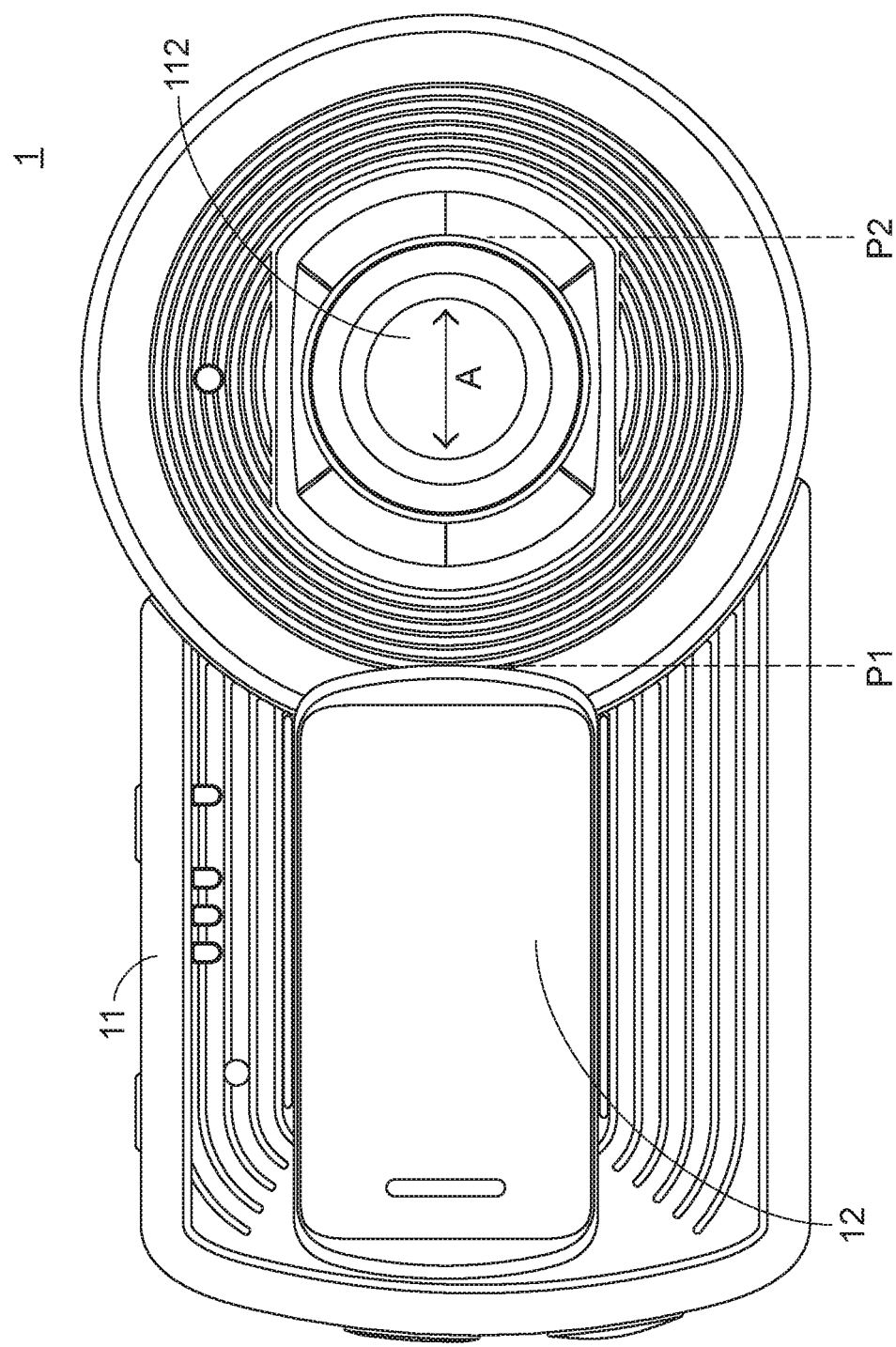
FIG. 1B is a schematic perspective view illustrating the implementation concepts of operating the audio and video streaming device as shown in FIG. 1A.
Figure 2A:
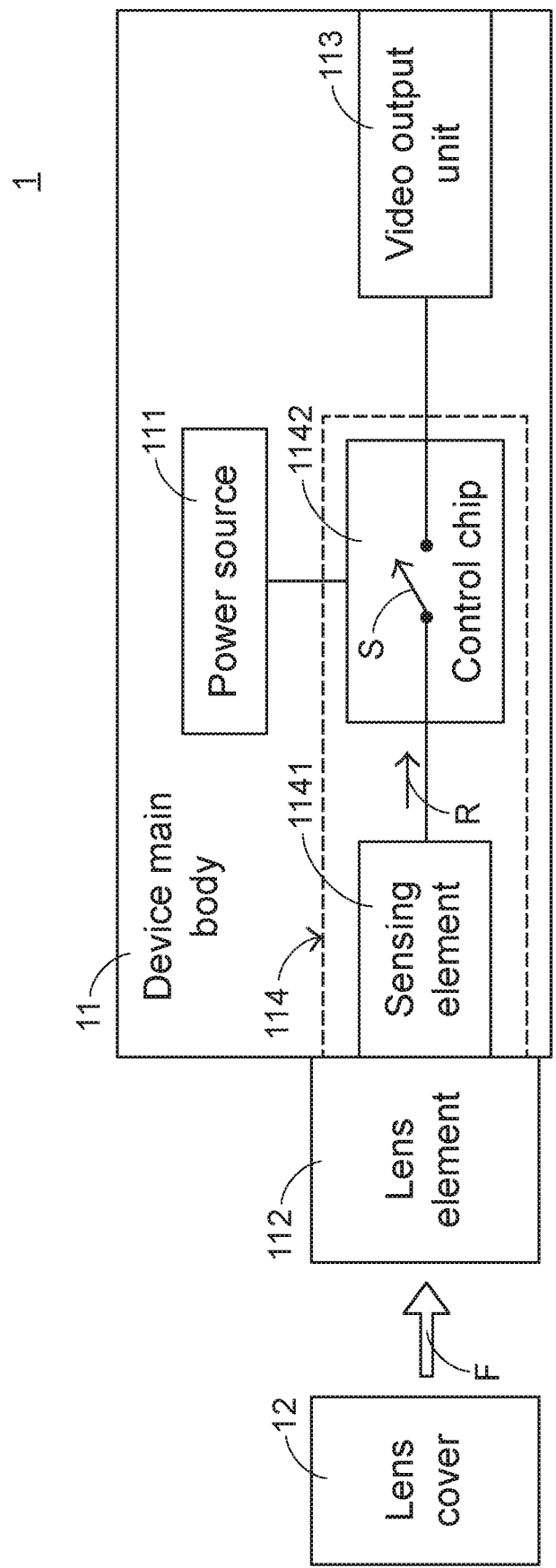
FIG. 2A is a schematic functional block diagram illustrating the architecture of the audio and video streaming device according to the embodiment of the present invention, in which the relationship between the lens cover and the lens element of the audio and video streaming device is in a closed state.
Figure 2B:
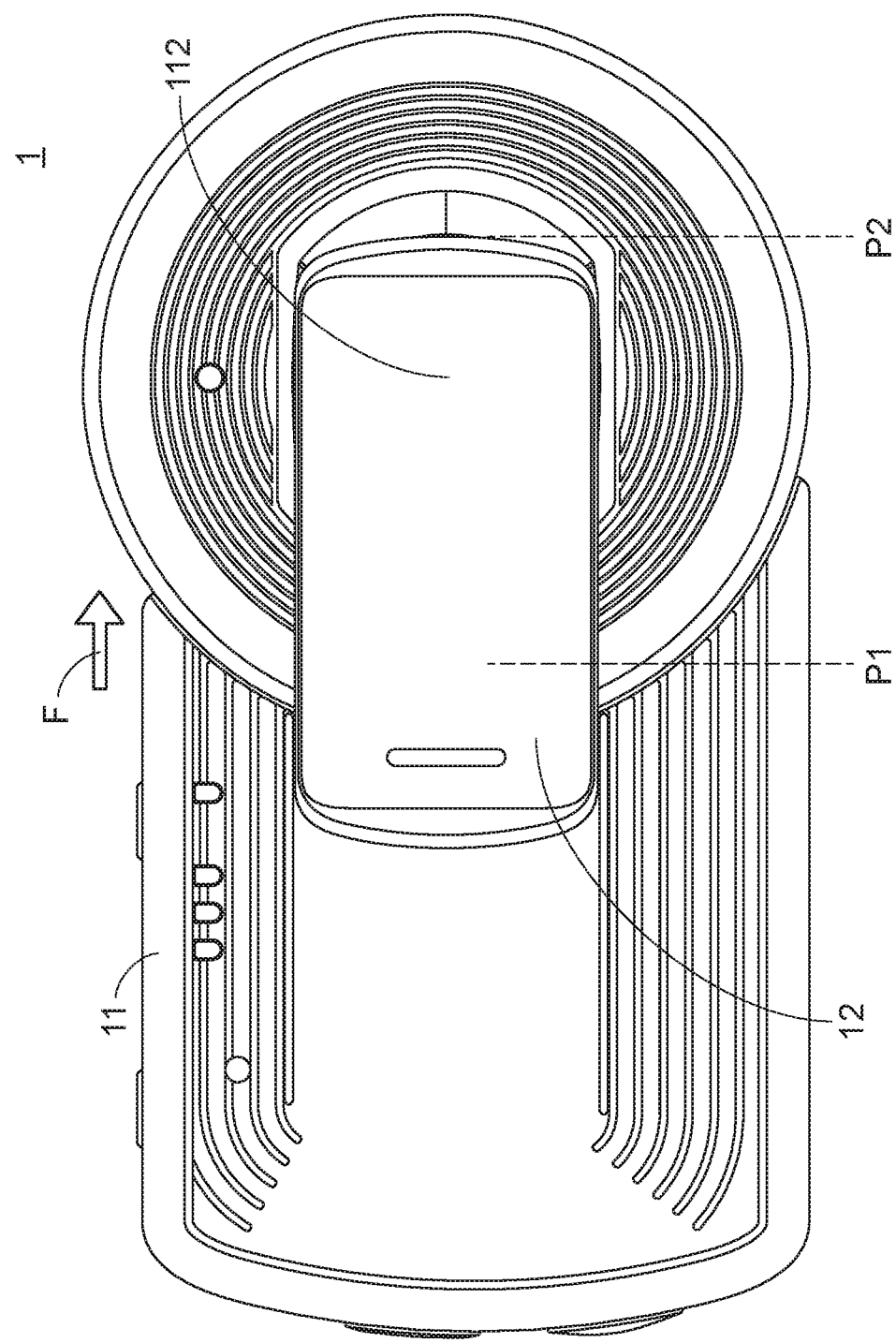
FIG. 2B is a schematic perspective view illustrating the implementation concepts of operating the audio and video streaming device as shown in FIG. 2A.

Please refer to FIGS. 1A, 1B, 2A and 2B. FIG. 1A is a schematic functional block diagram illustrating the architecture of an audio and video streaming device according to an embodiment of the present invention, in which the relationship between the lens cover and the lens element of the audio and video streaming device is in an opened state. FIG. 1B is a schematic perspective view illustrating the implementation concepts of operating the audio and video streaming device as shown in FIG. 1A. FIG. 2A is a schematic functional block diagram illustrating the architecture of the audio and video streaming device according to the embodiment of the present invention, in which the relationship between the lens cover and the lens element of the audio and video streaming device is in a closed state. FIG. 2B is a schematic perspective view illustrating the implementation concepts of operating the audio and video streaming device as shown in FIG. 2A.

Please refer to FIGS. 1A and 2A. In an embodiment, the audio and video streaming device 1 comprises a device main body 11 and a lens cover 12. The lens cover 12 is selectively combined with the device main body 11.

The device main body 11 at least comprises a power source 111, a lens element 112, an audio and video output unit 113 and a sensing and controlling module 114. The lens cover 12 is selectively combined with the lens element 112.

The sensing and controlling module 114 is electrically connected with the audio and video output unit 113. When the power source 111 is powered on (i.e., in an on state) and the relationship between the lens cover 12 and the lens element 112 is in an opened state (e.g., the state as shown in FIG. 1A), the sensing and controlling module 114 continuously issues an audio and video streaming signal I to the audio and video output unit 113. When the power source 111 is in the on state and the relationship between the lens cover 12 and the lens element 112 is in a closed state (e.g., the state as shown in FIG. 2A), the sensing and controlling module 114 stops issuing the audio and video streaming signal I to the audio and video output unit 113. Under this circumstance, the power source 111 is still powered on.

In an embodiment, the audio and video streaming signal I at least contains an image streaming signal and an audio streaming signal. Moreover, in the closed state, at least a portion of an effective photographing region A of the lens element 112 is sheltered by the lens cover 12. In the opened state, the effective photographing region A of the lens element 112 is not sheltered by the lens cover 12.

In an embodiment, the sensing and controlling module 114 at least comprises a sensing element 1141 and a control chip 1142. The sensing element 1141 is used for sensing whether the relationship between the lens cover 12 and the lens element 112 is in one of the closed state and the opened state. In addition, the sensing element 1141 generates and outputs a sensing result R. The control chip 1142 is electrically connected with the sensing element 1141, the power source 111 and the audio and video output unit 113. According to the sensing result R, the control chip 1142 determines whether the audio and video streaming signal I is transmitted to the audio and video output unit 113 while the power source 111 is maintained in the on state.

Preferably but not exclusively, the sensing element 1141 includes at least one of an electromechanical sensor, an optical sensor and an electromagnetic sensor.

Please refer to FIG. 1A again. If the control chip 1142 judges that the relationship between the lens cover 12 and the lens element 112 is in the opened state according to the sensing result R, the audio and video streaming signal I generated by the audio and video streaming device 1 is continuously transmitted to the audio and video output unit 113 under control of the control chip 1142. In an implementation example, the control chip 1142 comprises a control mechanism such as a control switch S. In the opened state, the control switch S1 is continuously turned on. Consequently, the audio and video streaming signal I can be continuously transmitted to the audio and video output unit 113.

Please refer to FIG. 2A again. If the control chip 1142 judges that the relationship between the lens cover 12 and the lens element 112 is in the closed state according to the sensing result R, the audio and video streaming signal I generated by the audio and video streaming device 1 is unable to be transmitted to the audio and video output unit 113 under control of the control chip 1142. In the closed state, the control switch S1 of the control chip 1142 is turned off. Consequently, the audio and video streaming signal I cannot be transmitted to the audio and video output unit 113.

In accordance with a feature of the present invention, the audio and video streaming signal I contains an image streaming signal and an audio streaming signal. When the user intends to temporarily interrupt the video recording process, the audio and video streaming device 1 stops outputting both of the image streaming signal and the audio streaming signal. In other words, the problem of leaking out the audio privacy information accidently will be avoided.

In accordance with another feature of the present invention, the power source 111 is maintained in the on state when the audio and video streaming signal I generated by the audio and video streaming device 1 is unable to be transmitted to the audio and video output unit 113 under control of the control chip 1142. When the relationship between the lens cover 12 and the lens element 112 is in the closed state, the audio and video streaming device 1 is still powered on because the power source 11 is in the on state. Since the audio and video streaming device 1 is not powered off, it is not necessary to restart the audio and video streaming device 1.

The structures of the audio and video streaming device as shown in FIGS. 1B and 2B are respectively related to the scenarios as shown in FIGS. 1A and 2A. The operating concepts of the audio and video streaming device 1 will be explained in more details with reference to FIGS. 1A, 1B, 2A and 2B.

After the lens cover 12 is moved from a first position P1 (as shown in FIG. 1B) to a second position P2 (as shown in FIG. 2B), a portion of the effective photographing region A of the lens element 112 is sheltered by the lens cover 12. Under this circumstance, the relationship between the lens cover 12 and the lens element 112 is in the closed state.

After the lens cover 12 is moved from the second position P2 (as shown in FIG. 2B) to the first position P1 (as shown in FIG. 1B), the effective photographing region A of the lens element 112 is not sheltered by the lens cover 12. Under this circumstance, the relationship between the lens cover 12 and the lens element 112 is in the opened state.

The method of moving the lens cover 12 will be described as follows. In an embodiment, the lens cover 12 is mechanically driven to undergo a moving action F between the first position P1 and the second position P2 in an upward/downward sliding manner, a leftward/rightward sliding manner, an upwardly/downwardly rotating manner or a leftward/rightward rotating manner. In another embodiment, the lens cover 12 undergoes the moving action F between the first position P1 and the second position P2 in a manual operation manner. That is, the lens cover 12 is movable between the first position P1 and the second position P2 in a manual operation manner.

Figure 3:
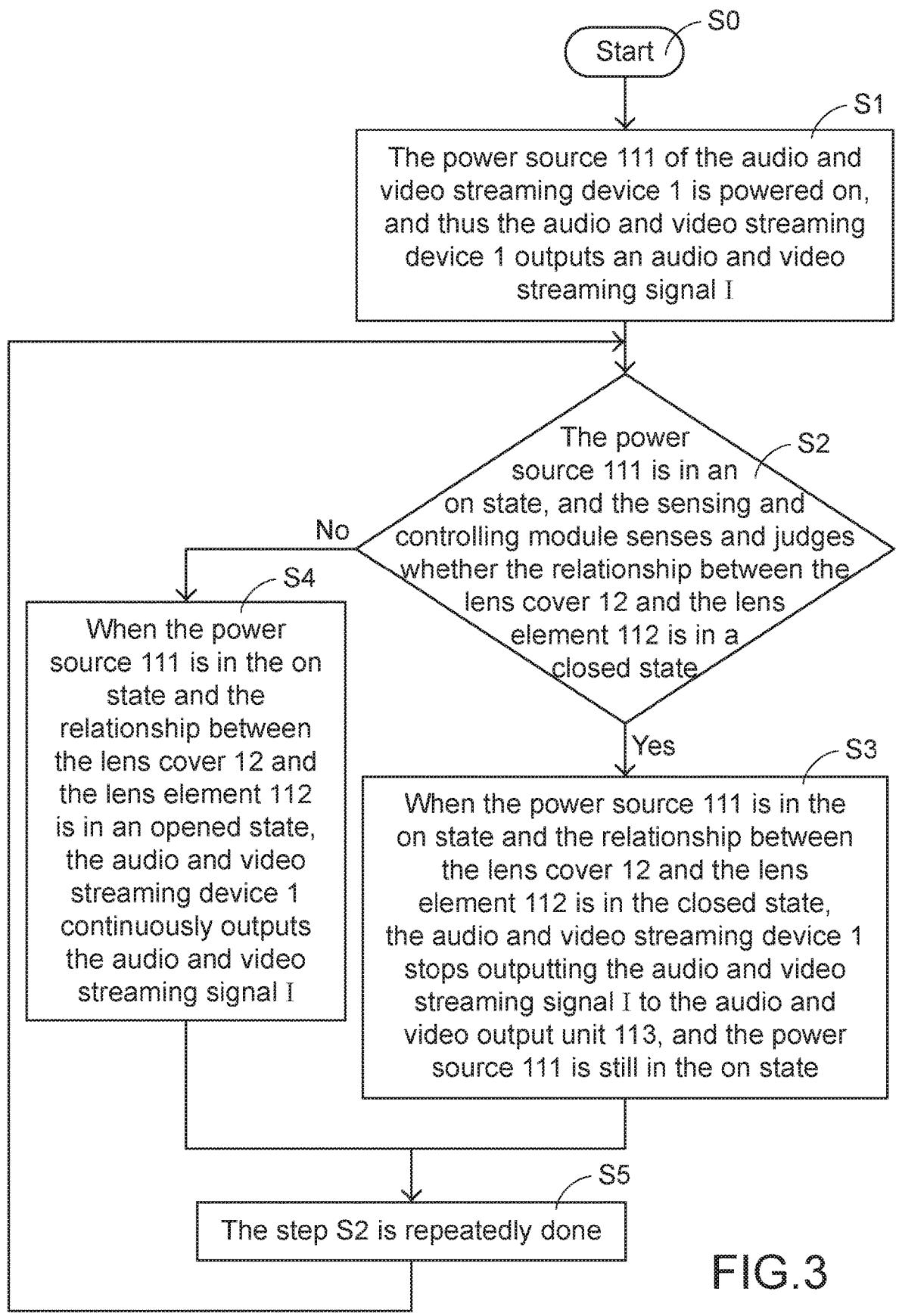
FIG. 3 is a flowchart illustrating a method for an audio and video streaming device to output an audio and video streaming signal according to an embodiment of the present invention.

The operations of the audio and video streaming device will be described as follows. FIG. 3 is a flowchart illustrating a method for an audio and video streaming device to output an audio and video streaming signal according to an embodiment of the present invention. The method at least comprises the following steps.

In a step S0, the flowchart is started.

In a step S1, the power source 111 of the audio and video streaming device 1 is powered on, so that the audio and video streaming device 1 outputs an audio and video streaming signal I.

In the step S2, the power source 111 is still powered on (i.e., in an on state), and the sensing and controlling module senses and judges whether the relationship between the lens cover 12 and the lens element 112 is in a closed state.

If the judging condition of the step S2 is satisfied, a step S3 is performed. When the power source 111 is in the on state and the relationship between the lens cover 12 and the lens element 112 is in a closed state, the audio and video streaming device 1 stops outputting the audio and video streaming signal I. Under this circumstance, the power source 111 is still in the on state.

If the judging condition of the step S2 is not satisfied, a step S4 is performed. When the power source 111 is in the on state and the relationship between the lens cover 12 and the lens element 112 is in an opened state, the audio and video streaming device 1 continuously outputs the audio and video streaming signal I.

In a step S5, the step S2 is repeatedly done.

From the above descriptions, the present invention provides an audio and video streaming device and a method for an audio and video streaming device to output an audio and video streaming signal. When the user intends to temporarily interrupt the video recording process, the audio and video streaming device stops outputting both of the image streaming signal and the audio streaming signal, and the power source of the audio and video streaming device is maintained in the on state. That is, when the user intends to temporarily interrupt the video recording process, the audio and video streaming device is not powered off. In other words, the audio and video streaming device and the method of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An audio and video streaming device, comprising:
   a device main body; and
   a lens cover selectively combined with the device main body,
   wherein the device main body at least comprises a power source, a lens element, an audio and video output unit and a sensing and controlling module, wherein the lens cover is selectively combined with the lens element, and the sensing and controlling module is electrically connected with the audio and video output unit,
   wherein when the power source is in an on state and a relationship between the lens cover and the lens element is in an opened state, the sensing and controlling module continuously issues an audio and video streaming signal to the audio and video output unit, the audio and video streaming signal at least contains an image streaming signal and an audio streaming signal, wherein when the power source is in the on state and the relationship between the lens cover and the lens element is in a closed state, the sensing and controlling module stops issuing the audio and video streaming signal to the audio and video output unit, and the power source is maintained in the on state;
   wherein after the lens cover is moved from a first position to a second position, the at least a portion of the effective photographing region of the lens element is sheltered by the lens cover, so that the relationship between the lens cover and the lens element is in the closed state, wherein after the lens cover is moved from the second position to the first position, the effective photographing region of the lens element is not sheltered by the lens cover, so that the relationship between the lens cover and the lens element is in the opened state;
   wherein the lens cover is movable between the first position and the second position in a manual operation manner.

2. The audio and video streaming device according to claim 1, wherein the lens cover is mechanically driven to undergo a moving action between the first position and the second position in an upward/downward sliding manner, a leftward/rightward sliding manner, an upwardly/downwardly rotating manner or a leftward/rightward rotating manner.

3. The audio and video streaming device according to claim 1, wherein the sensing and controlling module at least comprises:
   a sensing element sensing whether the relationship between the lens cover and the lens element is in one of the closed state and the opened state, and generating a sensing result; and
   a control chip electrically connected with the sensing element, the power source and the audio and video output unit, wherein according to the sensing result, the control chip determines whether the audio and video streaming signal is transmitted to the audio and video output unit while the power source is maintained in the on state.

4. The audio and video streaming device according to claim 3, wherein the sensing element includes at least one of an electromechanical sensor, an optical sensor and an electromagnetic sensor.

5. A method for controlling an audio and video streaming device to output an audio and video streaming signal, the audio and video streaming signal at least contains an image streaming signal and an audio streaming signal, the method comprising steps of:
   enabling a power source of the audio and video streaming device, so that the audio and video streaming device issues the audio and video streaming signal;
   when the power source is in an on state, sensing and judging whether a relationship between a lens cover and a lens element of the audio and video streaming device is in one of a closed state and an opened state;
   when the power source is in the on state and the relationship between the lens cover and the lens element is in the closed state, stopping issuing the audio and video streaming signal to the audio and video output unit, and the power source is still in the on state;
   when the power source is in the on state and the relationship between the lens cover and the lens element is in the closed state, allowing the audio and video streaming device to stop issuing the audio and video streaming signal and allowing the power source to be maintained in the on state; and
   when the power source is in the on state and the relationship between the lens cover and the lens element is in the opened state, allowing the audio and video streaming device to continuously issue the audio and video streaming signal;
   wherein after the lens cover is moved from a first position to a second position, the at least a portion of the effective photographing region of the lens element is sheltered by the lens cover, so that the relationship between the lens cover and the lens element is in the closed state, wherein after the lens cover is moved from the second position to the first position, the effective photographing region of the lens element is not sheltered by the lens cover, so that the relationship between the lens cover and the lens element is in the opened state;
   wherein the lens cover is movable between the first position and the second position in a manual operation manner.

6. The method according to claim 5, wherein the lens cover is mechanically driven to undergo a moving action between the first position and the second position in an upward/downward sliding manner, a leftward/rightward sliding manner, an upwardly/downwardly rotating manner or a leftward/rightward rotating manner.

7. The method according to claim 5, wherein the audio and video streaming device at least comprises a sensing element, and the sensing element senses whether the relationship between the lens cover and the lens element is in one of the closed state and the opened state.

8. The method according to claim 7, wherein the sensing element includes at least one of an electromechanical sensor, an optical sensor and an electromagnetic sensor.

* * * * *